(12) United States Patent
Araujo Nieto et al.

(10) Patent No.: US 10,589,601 B2
(45) Date of Patent: *Mar. 17, 2020

(54) AIR REGISTER WITH FOLDING VANES AND COOPERATING WALL FLAPS

(71) Applicant: FORD GLOBAL TECHNOLOGIES, LLC, Dearborn, MI (US)

(72) Inventors: Jorge Araujo Nieto, Calimaya (MX); Alfredo Pérez Montiel, Tula de Allende (MX); Gustavo Llamas Maldonado, Delegación Miguel Hidalgo (MX)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

This patent is subject to a terminal disclaimer.

(21) Appl. No.: 15/491,526

(22) Filed: Apr. 19, 2017

(65) Prior Publication Data
US 2018/0304726 A1 Oct. 25, 2018

(51) Int. Cl.
*B60H 1/34* (2006.01)

(52) U.S. Cl.
CPC ... *B60H 1/3421* (2013.01); *B60H 2001/3478* (2013.01)

(58) Field of Classification Search
CPC .................. B60H 1/3421; B60H 2001/3478

USPC .......................................................... 454/155
See application file for complete search history.

(56) References Cited

U.S. PATENT DOCUMENTS

| | | | |
|---|---|---|---|
| 5,080,002 A * | 1/1992 | Soethout | B60H 1/00871 454/154 |
| 6,199,295 B1 | 3/2001 | Smal et al. | |
| 6,497,275 B1 | 12/2002 | Elliot | |
| 7,331,851 B2 | 2/2008 | Koukouravas | |
| 8,485,872 B2 | 7/2013 | Valencia, Jr. | |
| 2004/0219874 A1 | 11/2004 | Karadia | |
| 2008/0194193 A1 | 8/2008 | Heilemann et al. | |
| 2016/0250909 A1 | 9/2016 | Schneider | |
| 2016/0288625 A1 | 10/2016 | Uhlenbusch et al. | |

FOREIGN PATENT DOCUMENTS

| | | | | |
|---|---|---|---|---|
| DE | 102014001959 A1 * | 8/2015 | ........... | B60H 1/3421 |
| EP | 1810857 A1 * | 7/2007 | ........... | B60H 1/3421 |

* cited by examiner

*Primary Examiner* — Edelmira Bosques
*Assistant Examiner* — Dana K Tighe
(74) *Attorney, Agent, or Firm* — David Coppiellie; King & Schickli, PLLC

(57) ABSTRACT

An air register includes a support, at least one folding vane connected to the support by a first pivot and a flap connected to the support by a second pivot. A method of distributing air from an air register is also provided.

11 Claims, 8 Drawing Sheets

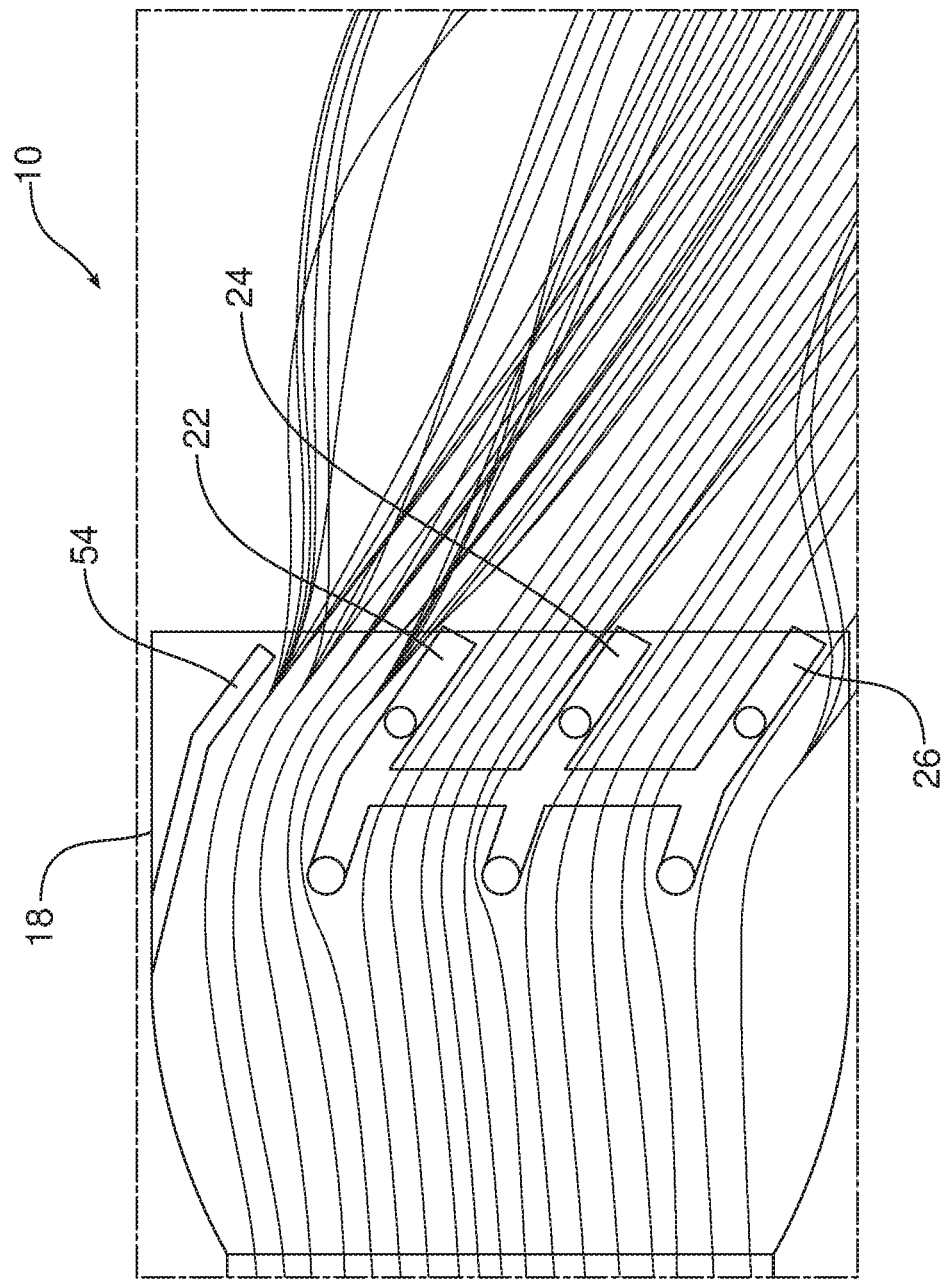

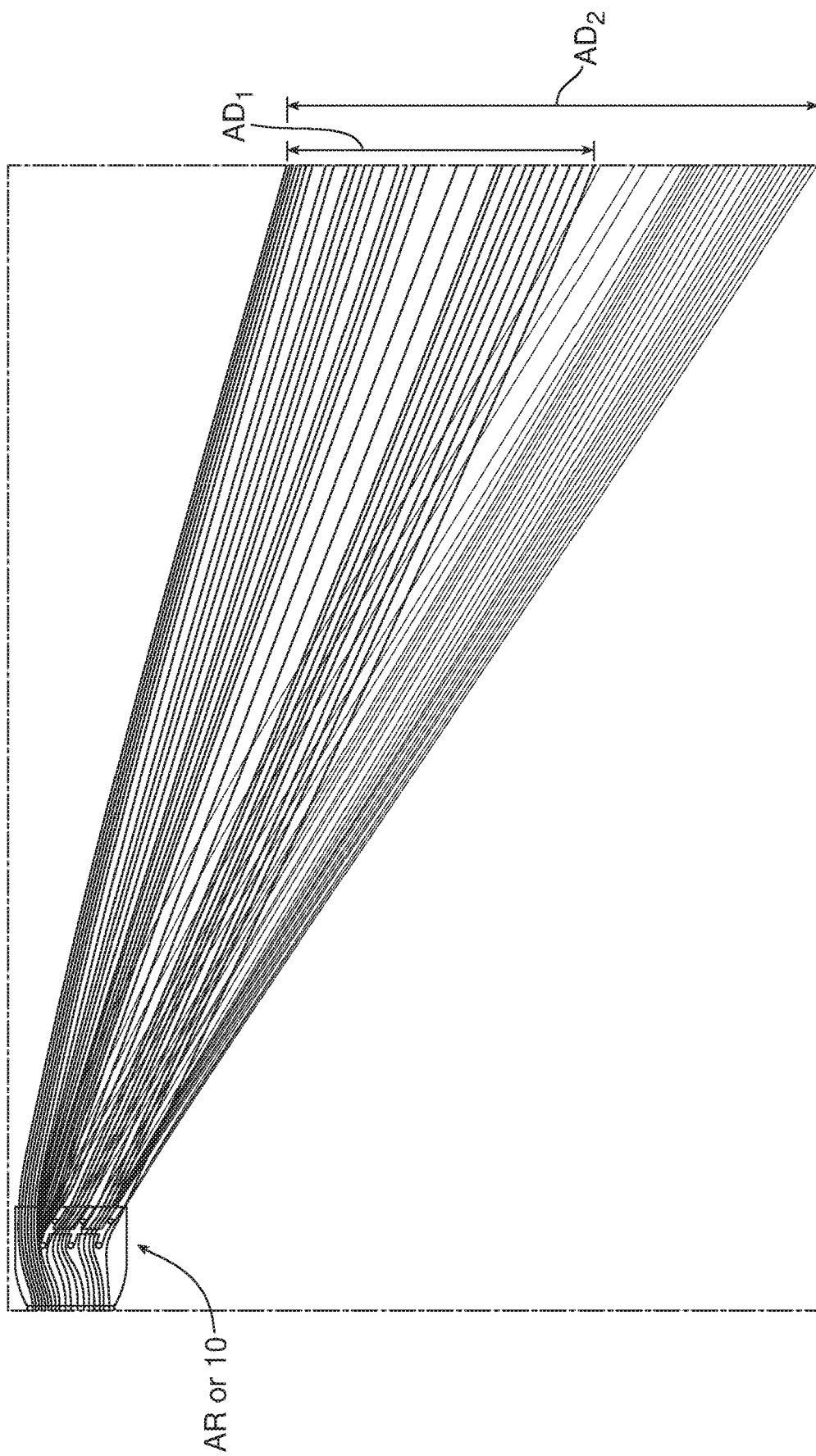

AIR REGISTER WITH FOLDING VANES AND COOPERATING WALL FLAPS

TECHNICAL FIELD

This document relates generally to the motor vehicle equipment field and, more particularly, to an air register for a heating, ventilation and air conditioning (HVAC) system that incorporates at least one folding vane and at least one wall flap to provide for improved airflow control and performance.

BACKGROUND

It is well known in the art to provide air registers with adjustable vanes to allow one to control the distribution of air from an HVAC system in a motor vehicle.

This document relates to a new and improved air register that incorporates at least one folding vane and at least one wall flap that are connected together by a linkage to provide for coordinated movement. Advantageously, the new air register provides a number of benefits and advantages including, but not necessarily limited to (a) better directional control of the airflow to reach target areas within a passenger compartment of a motor vehicle, (b) drastically reduce uncontrolled airflow at the register outlet as well as (c) allow airflow to be directed in a wider angle than possible with static vanes and a rigid housing as utilized in state of the art air registers.

SUMMARY

In accordance with the purposes and benefits described herein, a new and improved air register is provided. That air register comprises a support, at least one folding vane connected to the support by a first pivot and a flap connected to the support by a second pivot. The first pivot may define a first pivot axis and the second pivot may define a second pivot axis where the first pivot axis is parallel to the second pivot axis.

The air register may further include a linkage connecting the at least one folding vane with the flap in order to coordinate movement of the at least one folding vane and the flap. That linkage may be an articulated linkage. Such an articulated linkage may include a first link connected to the at least one folding vane by a first pivot joint, a second link connected to the flap by a second pivot joint and a third pivot joint connecting the first link to the second link.

The at least one folding vane may have a vane body including a first section, a second section and a hinge joint connecting the first section and the second section. The hinge joint may define a hinge axis and the hinge axis may be parallel to the first pivot axis and the second pivot axis.

The second section may include opposed guide pins and the support may include opposed arcuate guide tracks. The opposed guide pins may slide in the opposed arcuate guide tracks. The support may include opposed arcuate hinge tracks and the hinge joint may include opposed hinge pins sliding in the opposed arcuate hinge tracks. The opposed arcuate guide tracks may have a first radius of curvature $R_1$ and the opposed arcuate hinge tracks may have a second radius of curvature $R_2$ where $R_1 > R_2$.

The air register may further include a second flap connected to the support by a third pivot. In addition, the air register may include a second linkage connecting the at least one folding vane with the second flap to coordinate movement of the second flap with the at least one folding vane. That second linkage may be a second articulating linkage similar in construction to the first articulating linkage.

In accordance with an additional aspect, a method of distributing air from an air register may be described as comprising the steps of: (a) pivoting a folding vane about a first pivot axis, (b) pivoting a wall flap about a second pivot axis and (c) folding the folding vane about a hinge axis.

The method may further include the step of pivoting the folding vane and the wall flap in unison about parallel pivot axes. In addition, the method may include the step of increasing the angular range of air distribution from the air register by both pivoting and folding the folding vane. Still further, the method may also include the step of sweeping a first section of the folding vane about the first pivot axis through an arc and over-rotating a second section of the folding vane beyond that arc. The method may also include the step of displacing the hinge axis about the first pivot axis when pivoting the folding vane about the first pivot axis.

In the following description, there are shown and described several preferred embodiments of the air register and the related method of distributing air from an air register. As it should be realized, the air register and the related method are capable of other, different embodiments and their several details are capable of modification in various, obvious aspects all without departing from the air register and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the air register and method of distributing air from an air register and together with the description serve to explain certain principles thereof.

FIG. 4b is a view similar to 4a but illustrating the controlled airflow produced by the air register that is the subject matter of this document and that incorporates at least one folding vane and a wall flap for providing additional control to the airflow from the air register.

FIG. 5 is a schematic illustration of the wider angle of air distribution achieved utilizing the new and improved air register that is the subject matter of this document versus the prior art air register illustrated in FIG. 4a incorporating static vanes.

Figure 1:
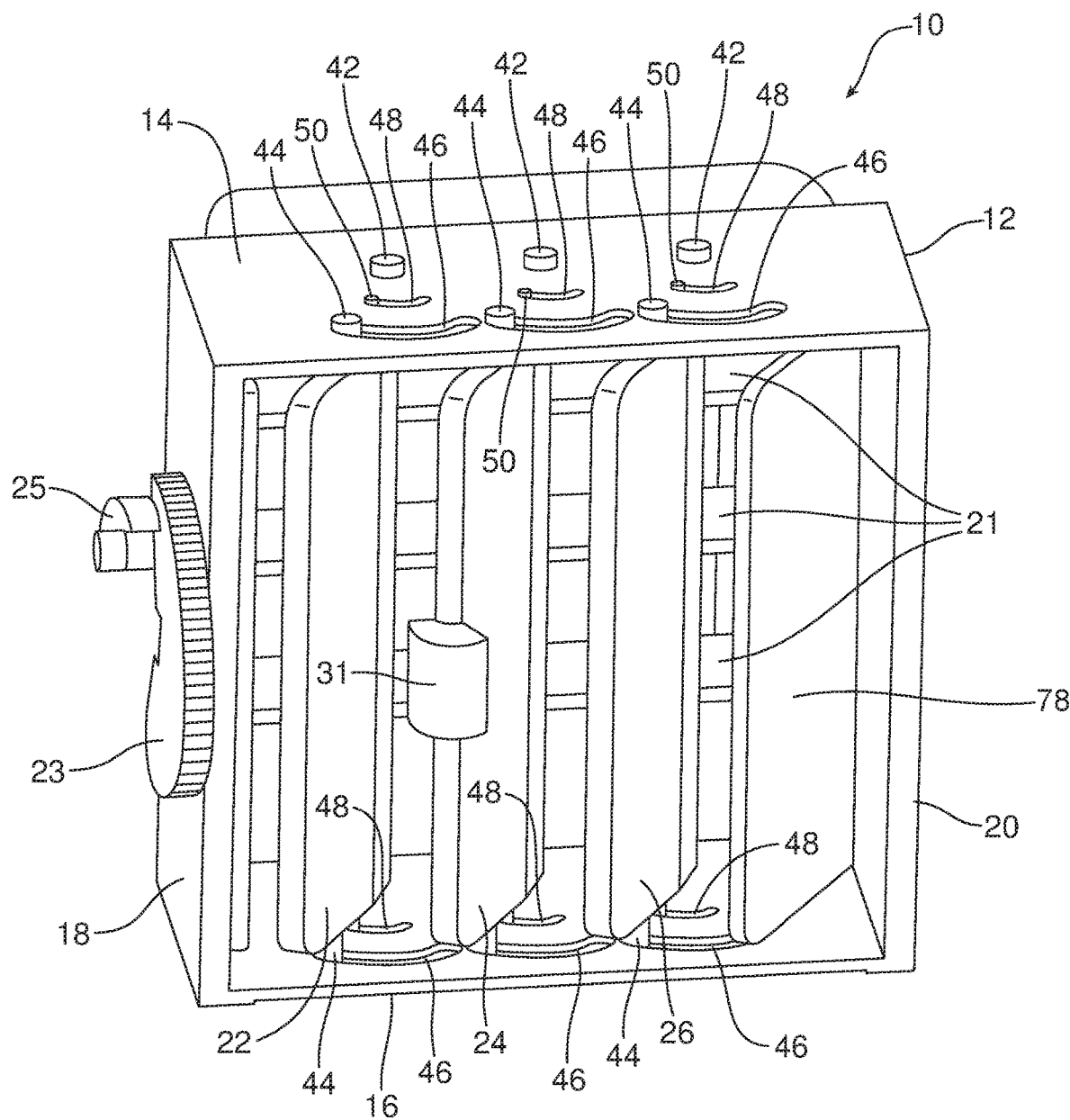
FIG. 1 is a detailed perspective view of the air register.
Figure 2:
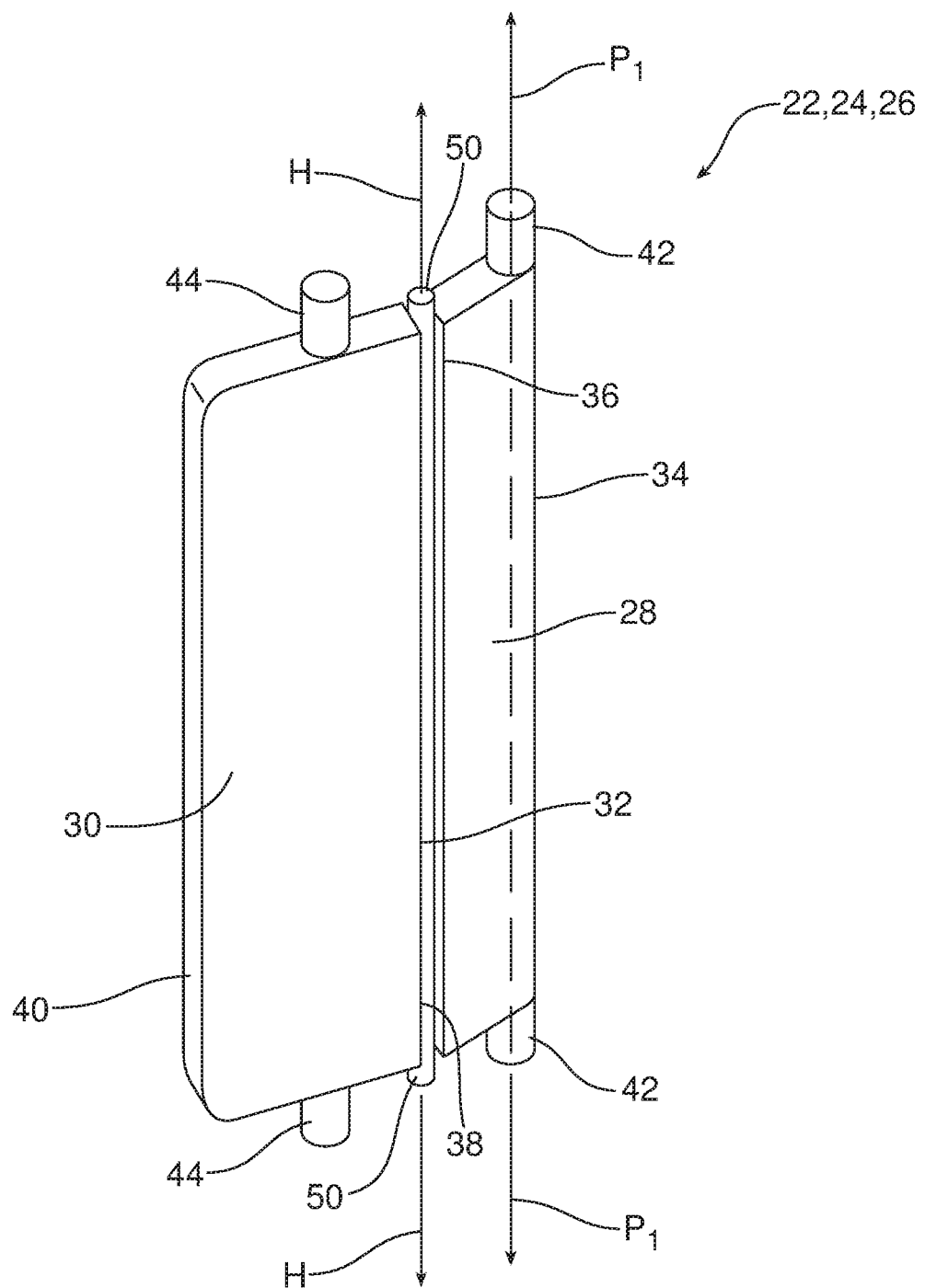
FIG. 2 is a detailed perspective view of a folding vane of the air register illustrated in FIG. 1.

Reference will now be made in detail to the present preferred embodiments of the air register and related method of distributing air from an air register, examples of which are illustrated in the accompanying drawing figures.

DETAILED DESCRIPTION

Reference is now made to FIGS. 1, 2 and 3a-3c which illustrate the new and improved air register 10. That air register 10 includes a support 12 having a top wall 14, a bottom wall 16, a first sidewall 18 and a second sidewall 20 defining an air register outlet. The air register 10 includes a first set of vanes 21, controlled by the actuator 23 that is connected to the vanes by the link 25. This first set of vanes 21 may be tipped upward or downward to control airflow and distribution in a first, and in the illustrated embodiment, vertical direction.

The air register 10 also includes a second set of vanes to control airflow and distribution in a second, and in the illustrated embodiment, horizontal direction. That second set of vanes comprises at least one folding vane and, more particularly, the illustrated embodiment includes three folding vanes 22, 24, 26. Those folding vanes 22, 24, 26 are connected together by a tie rod arrangement 29 so that they may be moved in unison by engaging and manipulating the actuator 31 (see FIG. 3a). As illustrated in detail in FIG. 2, each folding vane 22, 24, 26 has a vane body including a first section 28, a second section 30 and a hinge joint 32 connecting the first section and the second section.

More specifically, each first section 28 includes a first end 34 and a second end 36 and each second section 30 includes a proximal end 38 and a distal end 40. The hinge joint 32 connects the second end 36 of the first section 28 with the proximal end 38 of the second section 30. A first pivot 42 is provided at the first end 34 of the first section 28. The first pivot 42 includes opposed pivot pins defining a first pivot axis $P_1$. Similarly, the hinge joint 32 defines a hinge axis H that is parallel to the first pivot axis $P_1$.

The second section 30 includes opposed guide pins 44 and the support 12 includes opposed arcuate guide tracks 46 in the top wall 14 and the bottom wall 16. The opposed guide pins 44 slide in the opposed arcuate guide tracks 46 as the folding vanes 22, 24, 26 are displaced between the first end position illustrated in FIG. 3a, the second end position illustrated in FIG. 3c and the intermediate or straightaway position illustrated in FIG. 3b.

As further illustrated, the support 12 also includes opposed arcuate hinge tracks 48 in the top wall 14 and the bottom wall 16. The hinge joint 32 includes opposed hinge pins 50 that slide in the opposed arcuate hinge tracks 48 as the folding vanes 22, 24, 26 are displaced between the three positions illustrated in FIGS. 3a-3c. Here it should be noted that the opposed arcuate guide tracks 46 have a first radius of curvature $R_1$ and the opposed arcuate hinge tracks 48 have a second radius of curvature $R_2$ where $R_1>R_2$. Thus, as the folding vanes 22, 24, 26 are displaced between the three positions illustrated in FIGS. 3a-3c, the hinge joint 32 and the hinge axis H are displaced about the first pivot axis $P_1$. As will be described in greater detail below this provides the folding vanes 22, 24, 26 with an over-rotation that effectively increases the angular range of air distribution from the air register 10.

Figure 3A:
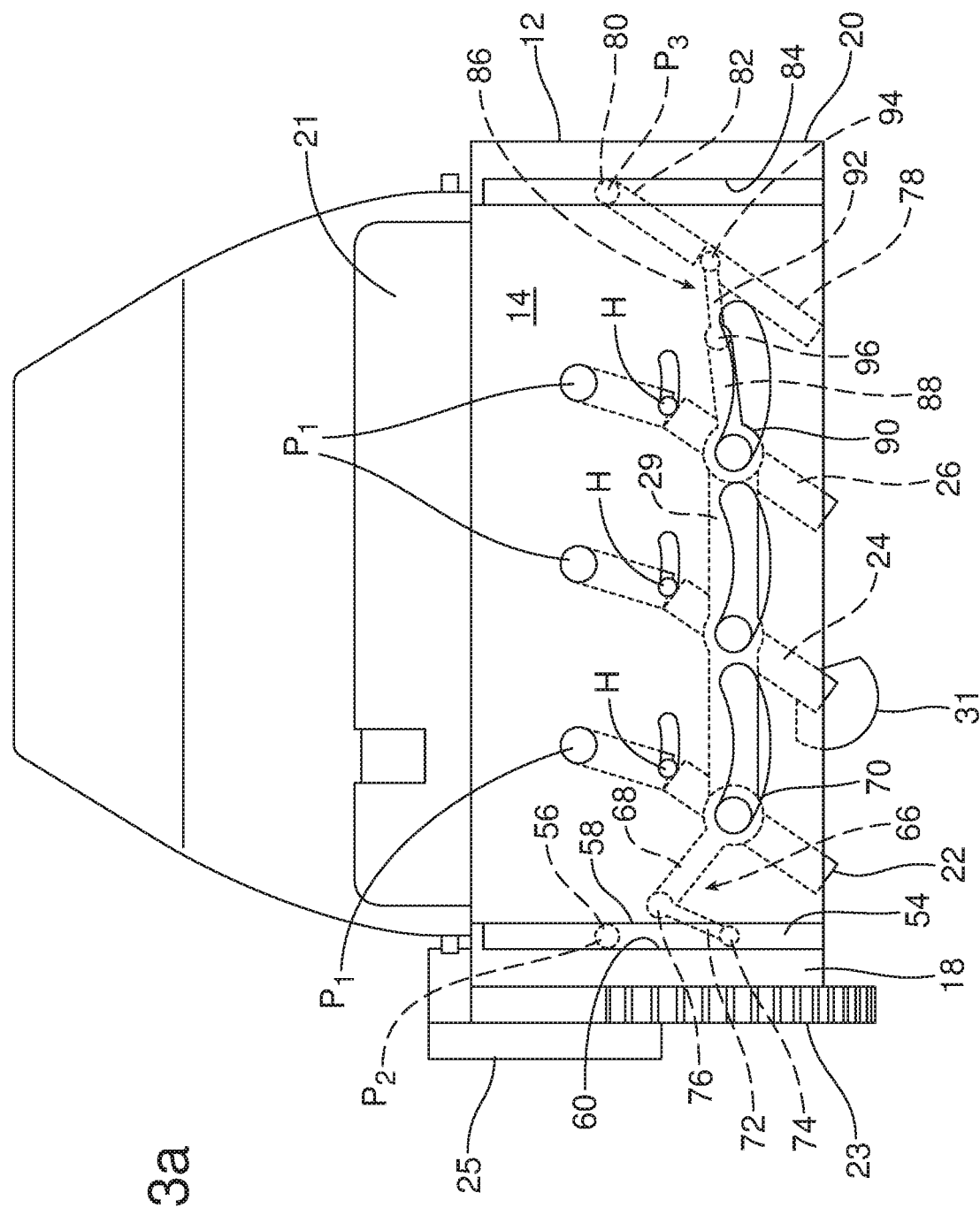
FIGS. 3a-3c are a series of top plan schematic views illustrating the folding vanes and wall flaps of the air register in three different positions.
Figure 3B:
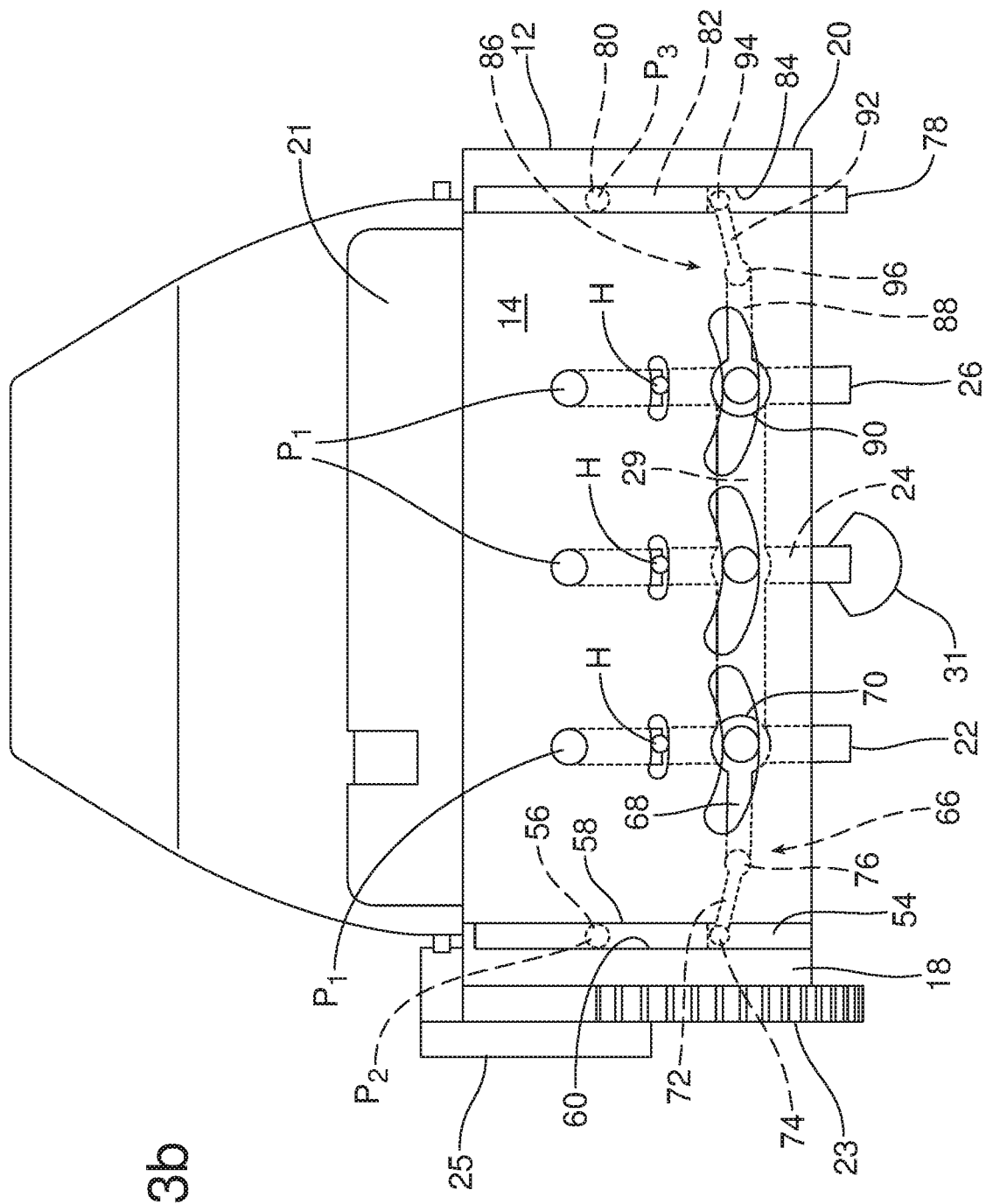
Figure 3C:
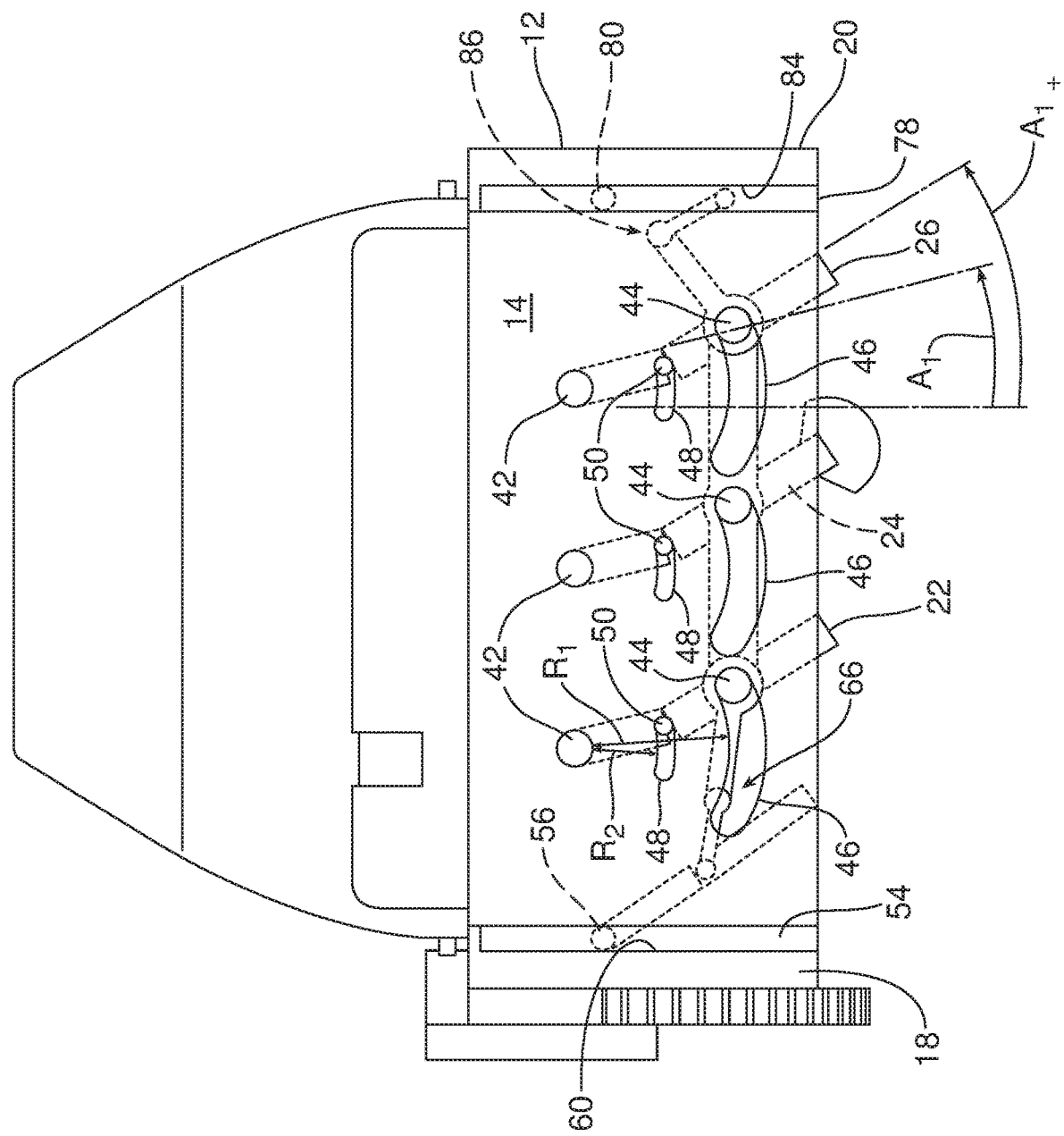

As best illustrated in FIGS. 3a-3c, a flap, in the form of a first wall flap 54 may be connected to the support 12 by a second pivot 56 formed by two opposed pivot pins defining a second pivot axis $P_2$. In the illustrated embodiment, the first pivot axis $P_1$ is parallel to the second pivot axis $P_2$ and the hinge axis H. FIGS. 3a-3c provide an end-on view of these axes $P_1$, $P_2$ and H. The second pivot 56 is provided at the upstream end 58 of the first wall flap 54 in a relief cavity 60 formed in the first sidewall 18.

A linkage 66 connects the folding vane 22 with the first wall flap 54 to coordinate movement of the folding vanes 22, 24, 26 with the first wall flap. As should be appreciated, the linkage 66 is an articulated linkage which includes a first link 68 connected to the folding vane 22 by a first pivot joint 70, a second link 72 connected to the wall flap 54 by a second pivot joint 74 and a third pivot joint 76 connecting the first link 68 with the second link 72.

The illustrated embodiment of the air register 10 also includes a second wall flap 78 connected to the support 12 by a third pivot 80 formed by two opposed pivot pins defining a third pivot axis $P_3$. In the illustrated embodiment, the first pivot axis $P_1$, the second pivot axis $P_2$, the hinge axis H and the third pivot axis $P_3$ are all parallel. The third pivot 80 is provided at the upstream end 82 of the second flap 78 in a relief cavity 84 in the second sidewall 20.

A linkage 86 connects the folding vane 26 with the second wall flap 78 to coordinate movement of the folding vanes 22, 24, 26 with the second wall flap. As should be appreciated, the linkage 86 is an articulated linkage which includes a third link 88 connected to the folding vane 26 by a fourth pivot joint 90, a fourth link 92 connected to the second wall flap 78 by a fifth pivot joint 94 and a sixth pivot joint 96 connecting the third link and the fourth link.

Figure 4A:
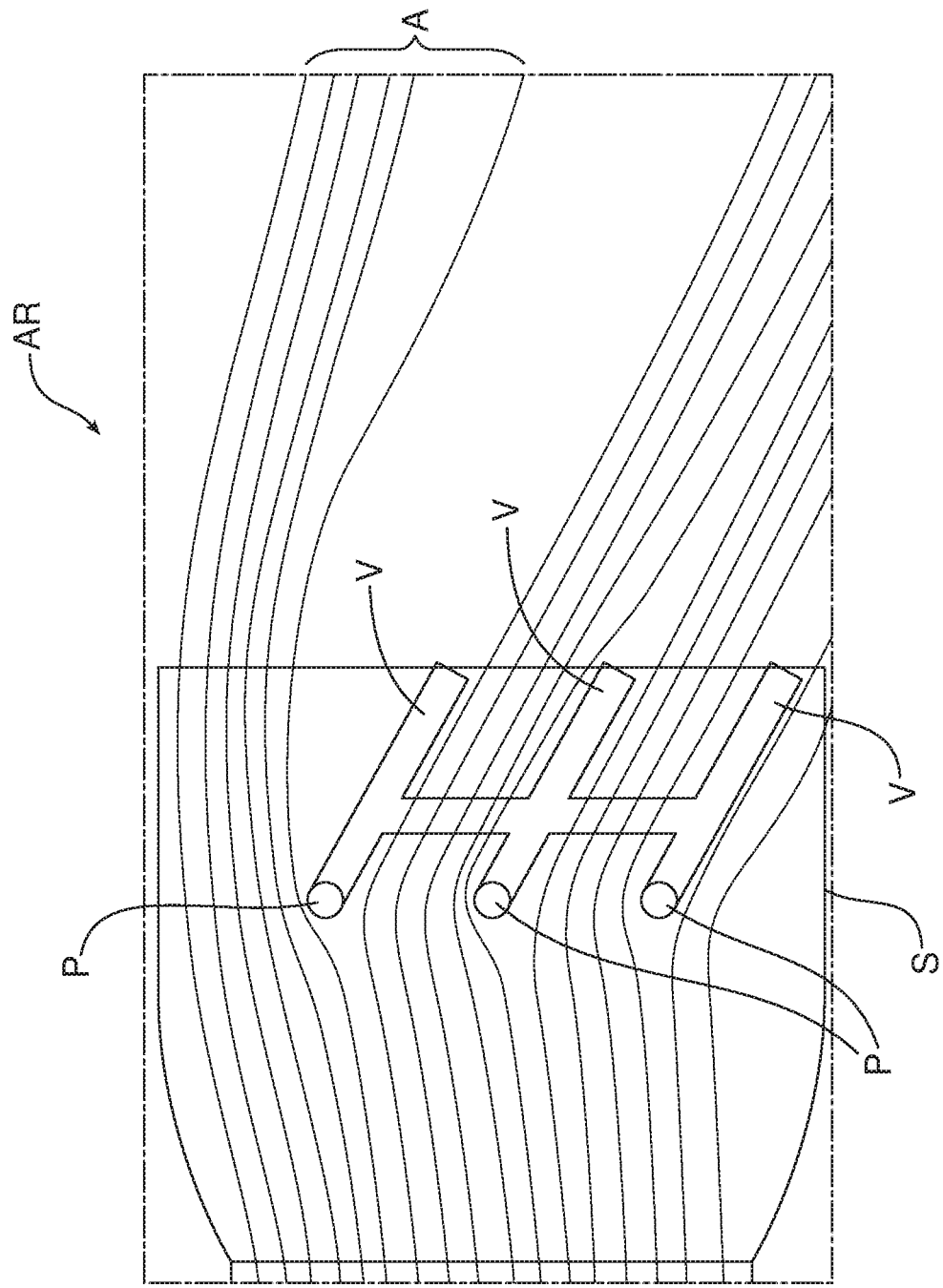
FIG. 4a is a schematic illustration of the uncontrolled airflow characteristic of a prior art air register that does not include a folding vane and a wall flap.

FIG. 4a illustrates a prior art air register AR having static or rigid vanes V mounted on pivots P to the support S. As illustrated, when those vanes V are oriented as shown, the air A along the support S at the top of the drawing figure flows in an uncontrolled manner from the air register.

In contrast, as illustrated in FIG. 4b, when the folding vanes 22, 24, 26 of the present air register 10 are oriented as illustrated, the first wall flap 54 at the top of the figure is displaced from its home position within the relief cavity 60 of the sidewall 18 and projects outwardly toward the folding vanes so as to provide directional control of the airflow along the sidewall of the support 12. Advantageously, this allows one to more accurately direct the air from the air register 10 toward a desired target.

Thus, as illustrated in FIG. 3a, when the folding vanes 22, 24, 26 are in the first end position directed to the left, the linkage 86 between the folding vane 26 and the second wall flap 78 ensures that the second wall flap is deployed to direct the airflow along the second sidewall 20 to the left with the other air being directed by the folding vanes. At the same time the linkage 66 between the folding vane 22 and the first wall flap 54 ensures that the first wall flap is maintained in its home position in the relief cavity 60 of the first sidewall 18 so as to provide smooth airflow along the first sidewall which may be directed to the left by the folding vane 22.

In contrast, when the folding vanes 22, 24, 26 are in the intermediate or straight airflow position illustrated in FIG. 3b, the linkages 66, 86 ensure that the respective first wall flap 54 and second wall flap 78 are in their home positions in the respective relief cavities 60, 84 of the first sidewall 18 and second sidewall 20 to allow smooth straight airflow along those two sidewalls and all across the air register 10.

When the folding vanes 22, 24, 26 are in the second end position illustrated in FIG. 3c, to direct airflow to the right, the linkage 86 ensures that the second wall flap 78 is maintained in the home position within the relief cavity 84 of the sidewall 20 to ensure smooth airflow along that sidewall which may be directed to the right by the folding vane 26. At the same time, the linkage 66 ensures that the first wall flap 54 is fully deployed from the relief cavity 60 in the first sidewall 18 so that the air along that sidewall is directed to the right along with the other air being directed by the folding vanes 22, 24, 26.

Consistent with the above description, a method of distributing air from the air register 10 comprises pivoting one or more folding vanes 22, 24, 26 about their first pivot axes $P_1$, pivoting the first wall flap 54 about its second pivot axis $P_2$, pivoting the second wall flap 78 about its third pivot axis $P_3$ and folding the one or more folding vanes 22, 24, 26 about their hinge axes H. As described above and illustrated in FIGS. 3a-3c, the method also includes pivoting the folding vanes 22, 24, 26 and the wall flaps 54, 78 in unison about parallel pivot axes $P_1$, $P_2$, $P_3$.

As illustrated in FIG. 5, the method also includes increasing the angular range of air distribution from the air register 10 by both pivoting and folding the folding vanes 22, 24, 26. More specifically, $AD_1$ represents the angular range of air distribution provided by a prior art air register such as illustrated in FIG. 4a including a series of static vanes V. In contrast, $AD_2$ represents the increased angular range of air distribution provided by the air register 10 including the folding vanes 22, 24, 26 and the wall flaps 54, 78. Thus, it should be appreciated that the air register 10 provides a wider range of air distribution for a given size of air register when compared to a prior art air register AR incorporating static vanes V that do not fold. Thus, it should be appreciated that the air register 10 may be made narrower while still providing a desired angular range of air distribution. This opens space on an instrument panel for other components or controls and significantly increases the styling freedom of designers. Accordingly, the air register 10 represents a very significant advance in the art.

As should be appreciated from the foregoing description, the method may also include the step of sweeping the first section 28 of a folding vane 22, 24, 26 about a first pivot axis arc $A_1$ as illustrated to an arc $A_{1+}$ and over-rotating a second section 30 of the folding vane through an arc $A_1$ and over-rotating a second section 30 of the folding vane beyond that arc $A_1$.to an arc $A_{1+}$.(see FIG. 3c). Further, the method may include the step of displacing the hinge axis H about the first pivot axis $P_1$ when pivoting the folding vane 22, 24, 26 about the first pivot axis.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An air register, comprising:
   a support;
   at least one folding vane connected to said support by a first pivot;
   a flap connected to said support by a second pivot; and
   a linkage connecting said at least one folding vane with said flap to coordinate movement of said at least one folding vane and said flap wherein (a) said linkage is an articulated linkage including a first link connected to said at least one folding vane by a first pivot joint, a second link connected to said flap by a second pivot joint and a third pivot joint connecting said first link to said second link; (b) said first pivot defines a first pivot axis and said second pivot defines a second pivot axis where said first pivot axis is parallel to said second pivot axis; (c) said at last one folding vane has a vane body including a first section, a second section and a hinge joint connecting said first section and said second section; (d) said hinge joint defines a hinge axis and said hinge axis is parallel to said first pivot axis and said second pivot axis; (e) said second section includes opposed guide pins and said support includes opposed arcuate guide tracks, said opposed guide pins sliding in said opposed arcuate guide tracks; and (f) said second section includes opposed guide pins and said support includes opposed arcuate guide tracks, said opposed guide pins sliding in said opposed arcuate guide tracks.

2. The air register of claim 1, wherein said opposed arcuate guide tracks have a first radius of curvature $R_1$ and said opposed arcuate hinge tracks have a second radius of curvature $R_2$ where $R_1 > R_2$.

3. The air register of claim 2, further including a second flap connected to said support by a third pivot.

4. The air register of claim 3, including a second linkage connecting said at least one folding vane with said second flap to coordinate movement of said second flap with said at least one folding vane.

5. The air register of claim 4, wherein said second linkage is a second articulating linkage.

6. A method of distributing air from an air register, comprising:
   pivoting a folding vane about a first pivot axis;
   pivoting a wall flap about a second pivot axis;
   folding said folding vane about a hinge axis; and
   displacing said hinge axis about said first pivot axis when pivoting said folding vane about said first pivot axis.

7. The method of claim 6, including pivoting said folding vane and said wall flap in unison about parallel pivot axis.

8. The method of claim 7, including increasing angular range of air distribution from said air register by both pivoting and folding said folding vane.

9. The method of claim 8, including sweeping a first section of said folding vane about said first pivot axis through an arc $A_1$.

10. The method of claim 9, including over-rotating a second section of said folding vane past beyond said arc $A_1$.

11. An air register, comprising:
    a support, wherein said support includes opposed arcuate hinge tracks;
    at least one folding vane connected to said support by a first pivot, wherein said at least one folding vane has a vane body including a first section, a second section and a hinge joint connecting said first section and said second section, wherein said hinge joint includes opposed hinge pins sliding in said opposed arcuate hinge tracks; and
    a flap connected to said support by a second pivot.

* * * * *